United States Patent
Cesiel et al.

(10) Patent No.: US 11,863,004 B2
(45) Date of Patent: Jan. 2, 2024

(54) SPLIT-PHASE BIDIRECTIONAL ON-BOARD CHARGER

(71) Applicant: GM GLOBAL TECHNOLOGY OPERATIONS LLC, Detroit, MI (US)

(72) Inventors: Douglas S. Cesiel, Farmington, MI (US); Samantha Gunter Miller, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 112 days.

(21) Appl. No.: 17/748,337

(22) Filed: May 19, 2022

(65) Prior Publication Data

US 2023/0378789 A1 Nov. 23, 2023

(51) Int. Cl.
*H02J 7/00* (2006.01)
*B60L 53/22* (2019.01)

(52) U.S. Cl.
CPC ............ *H02J 7/0068* (2013.01); *B60L 53/22* (2019.02); *B60L 2210/10* (2013.01); *B60L 2210/40* (2013.01); *H02J 2207/20* (2020.01)

(58) Field of Classification Search
CPC ..... H02J 7/0068; H02J 2207/20; B60L 53/22; B60L 2210/10; B60L 2210/40
See application file for complete search history.

(56) References Cited

U.S. PATENT DOCUMENTS

| | | | |
|---|---|---|---|
| 2021/0221249 A1* | 7/2021 | Ge | H02M 1/4225 |
| 2022/0209543 A1* | 6/2022 | Lee | H02J 7/02 |
| 2023/0264594 A1* | 8/2023 | Nergaard | B60L 53/11 |
| | | | 320/109 |

* cited by examiner

*Primary Examiner* — Jared Fureman
*Assistant Examiner* — Duc M Pham
(74) *Attorney, Agent, or Firm* — Quinn IP Law

(57) ABSTRACT

A split-phase bidirectional on-board charger (OBC) has separate charging and discharging modes, and includes a switchgear block connectable to an offboard charging station during the charging mode, and to an external alternating current (AC) load during the discharging mode. The OBC includes first and second DC-AC converters connected to the switchgear block and DC-DC converter connected to the first and second DC-AC converters and a DC bus. During the charging mode, the DC-AC converters output a DC link voltage to the DC-DC converter. The DC-DC converter outputs a DC charging voltage or current to the DC bus when the link voltage reaches a predetermined value. During the discharging mode, the DC-AC converters receive a DC discharging voltage or current from the DC-DC converter and together selectively output a split-phase AC voltage through the switchgear block to the AC electrical load.

20 Claims, 3 Drawing Sheets

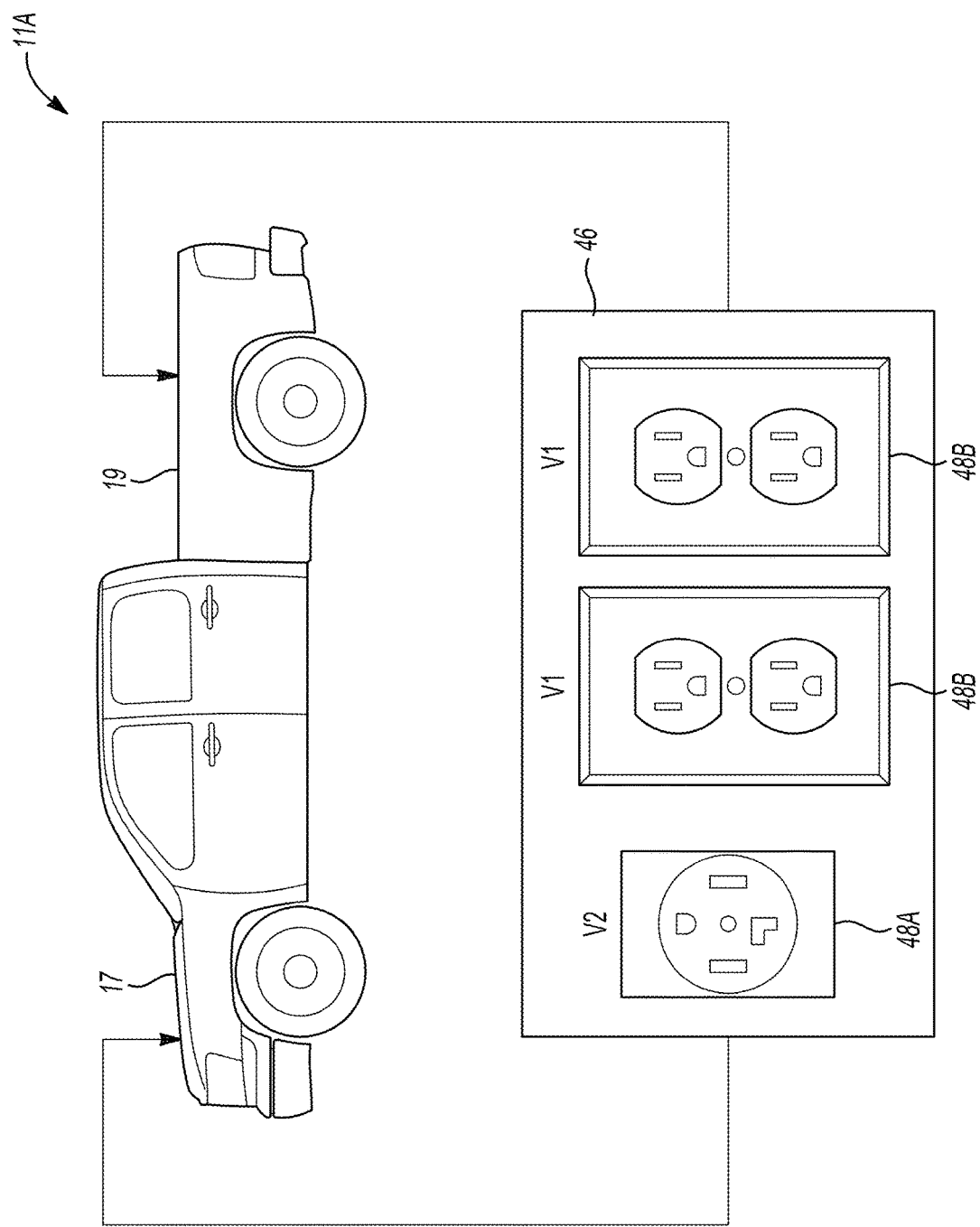

SPLIT-PHASE BIDIRECTIONAL ON-BOARD CHARGER

INTRODUCTION

Electrochemical battery packs are used aboard battery electric systems as a primary power supply for energizing a host of electrical components. Aboard an electric vehicle for example, a propulsion battery pack is arranged on a high-voltage direct current (DC) bus, with the battery pack having an application-suitable number of cylindrical, prismatic, or pouch-style battery cells. The DC bus ultimately powers one or more electric traction motors and other high-voltage power electronic components during discharging modes, and conducts a charging current to constituent cells of the battery pack during charging modes. Lower-voltage components such as a 12-volt lead acid battery and onboard lighting and sound systems in turn are connected to an auxiliary/low-voltage DC bus.

Electrified powertrain systems used aboard electric vehicles, plug-in hybrid electric vehicles, and other mobile or stationary battery electric systems may be equipped with an onboard charger (OBC) operable for converting an AC charging voltage into a DC charging voltage suitable for charging the above-noted battery pack. A typical OBC contains multiple dies of IGBTs, MOSFETs, or other application-suitable semiconductor switches having individually-controllable ON/OFF conducting states. The conducting states are rapidly controlled, typically via pulse width modulation in conjunction with signal filtering, while the battery pack remains galvanically isolated. As existing onboard charging architectures tend to include diode rectification, the resulting power conversion processes is unidirectional. However, emerging bidirectional OBC architectures permit selective powerflow in the opposite direction, thus enabling a battery pack to supply power to the grid (vehicle-to-grid, or V2G) or to an externally connected electrical load (vehicle-to-load, or V2L). Such a capability is collectively referred to herein and in the general art as vehicle-to-anything (V2X).

SUMMARY

Disclosed herein is a split-phase on-board charging module architecture, hereinafter referred to as an onboard charger (OBC) for simplicity, which is operable for selectively outputting a split-phase voltage to a connected external alternating current (AC) load, while retaining the capability of outputting a single-phase voltage. In particular, the hardware and software solutions described below integrate a split-phase voltage output and a diverter switch set ("switchgear") into the circuit architecture of the OBC to provide enhanced performance capabilities relative to single-phase bidirectional chargers.

In contrast to such single-phase bidirectional architectures, the OBC architecture described below uses two DC-AC converters and a DC-DC converter. The dual DC-AC converters work together during a charging mode of an onboard battery pack to provide a total charging power equal to the sum of their respective power outputs. That is, the first DC-AC converter and the second DC-AC converter may have a respective power capability that is about half of a power capability of the DC-DC converter, i.e., ideally 50%, or within about 40% to 50% in another implementation. During a vehicle-to-anything (V2X) operation, the same two DC-AC converters output sinusoidal AC voltage waveforms that are 180° out of phase, i.e., the above-noted split-phase power. In a representative North American implementation of the present teachings, the AC voltage capability is 120 V and 240 V, with this non-limiting example voltage output being used herein for illustrative consistency. Nominally, however, the present approach outputs voltages at first and second voltage levels V1 and V2, with the second voltage level V2 being twice the level of the first voltage level V1. Thus, single-phase power may be provided to the AC electrical load at the first voltage level V1 as needed based on the power requirement of the AC electrical load, or split-phase power when energizing an AC electrical load at the first and second voltage levels V1 and V2 in a split-phase output scenario.

An aspect of the present disclosure includes a split-phase bidirectional OBC for use with a DC voltage bus, with the OBC having a charging mode and a discharging mode. The OBC may include a switchgear block connectable to an offboard charging station during the charging mode, and to an external AC electrical load during the discharging mode, and first and second DC-AC converters connected to the switchgear block. The OBC further includes a DC-DC converter connected to the first DC-AC converter, the second DC-AC converter, and the DC bus. During the charging mode the first and second DC-AC converters are configured to output a DC link voltage to the DC-DC converter, and the DC-DC converter is configured to output a DC charging voltage or current to the DC bus when the DC link voltage reaches a predetermined value. During the discharging mode, the first and second DC-AC converters are configured to receive a DC discharging voltage or current from the DC-DC converter and together selectively output a split-phase AC voltage through the switchgear block to power the AC electrical load.

The AC electrical load in some implementations may include a single-phase AC device. The OBC in this instance may be configured to output single-phase power via the first or second DC-AC converter to the single-phase AC device during the discharging mode.

The switchgear block may include three switches, in which case the first DC-AC converter may be connected to a first pair of the three switches, and the second DC-AC converter may be connected to a second pair of the three switches, such that the first DC-AC converter and the second DC-AC converter share one of the three switches in common. The three switches are mechanical relays or contactors in a possible construction.

An output connector of the OBC may be electrically connected to the switchgear block and connectable to the external AC electrical load during the discharging mode of the OBC. Such an output connector may include a first voltage terminal, a second voltage terminal, and a neutral terminal. During the discharging mode the first pair of the three switches are respectively connected to the second voltage terminal and the neutral terminal, and the second pair of the three switches are respectively connected to the neutral terminal and the first voltage terminal. An input connector of the OBC may include an L1 voltage terminal and an L2/N voltage terminal. The input connector in some configurations receives AC power from a Society of Automotive Engineers (SAE) J1772 charging plug.

The first and second DC-AC converters may have a respective power capability that is about half of a power capability of the DC-DC converter.

Another aspect of the present disclosure includes an electrified powertrain system having a DC bus, a power inverter having a DC side and an AC side, a battery pack connected to the DC bus and to the DC side of the power inverter, a polyphase rotary electric machine connected to the AC side of the power inverter and to a mechanical load, and a split-phase bidirectional OBC connected to the battery pack. As noted above, the OBC has a charging mode and a discharging mode, and includes a switchgear block connectable to an offboard charging station during the charging mode and to an external AC electrical load during the discharging mode. The OBC in this exemplary configuration includes first and DC-AC converters connected to the switchgear block, and a DC-DC converter connected to the first DC-AC converter, the second DC-AC converter, and the DC bus. The first and second DC-AC converters have a respective power capability that is about half of a power capability of the DC-DC converter. As with the above-summarized embodiments, during the charging mode the first and second DC-AC converters are configured to output a DC link voltage to the DC-DC converter, and the DC-DC converter is configured to output a DC charging voltage or current to the DC bus when the DC link voltage reaches a predetermined value. During the discharging mode the first and second DC-AC converters are configured to receive a DC discharging voltage or current from the DC-DC converter and together selectively output a split-phase AC voltage through the switchgear block to power the external AC electrical load.

Also disclosed herein is a method for controlling a split-phase bidirectional OBC having a charging mode and a discharging mode. An embodiment of the method includes, during the charging mode, controlling, via an electronic control unit (ECU), a first DC-AC converter, and a second DC-AC converter on a DC bus to output a DC link voltage to a DC-DC converter. The first DC-AC converter is connected to a first pair of three switches of a switchgear block. The second DC-AC converter is connected to a second pair of the three switches of the switchgear block, such that the first and second DC-AC converters share one of the three switches in common. The method includes controlling the DC-DC converter during the charging mode via the ECU to output a DC charging voltage or current to the DC bus when the DC link voltage reaches a predetermined value. During the discharging mode, the method in this embodiment includes providing a DC discharging voltage or current from the DC-DC converter to the first DC-AC converter and the second DC-AC converter, and also controlling the first and second DC-AC converters via the ECU to selectively output a split-phase AC voltage through a switchgear block to power an external AC electrical load.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 4 is a side view illustration of a representative motor vehicle equipped with power outlets in accordance with an aspect of the disclosure.

Figure 1:
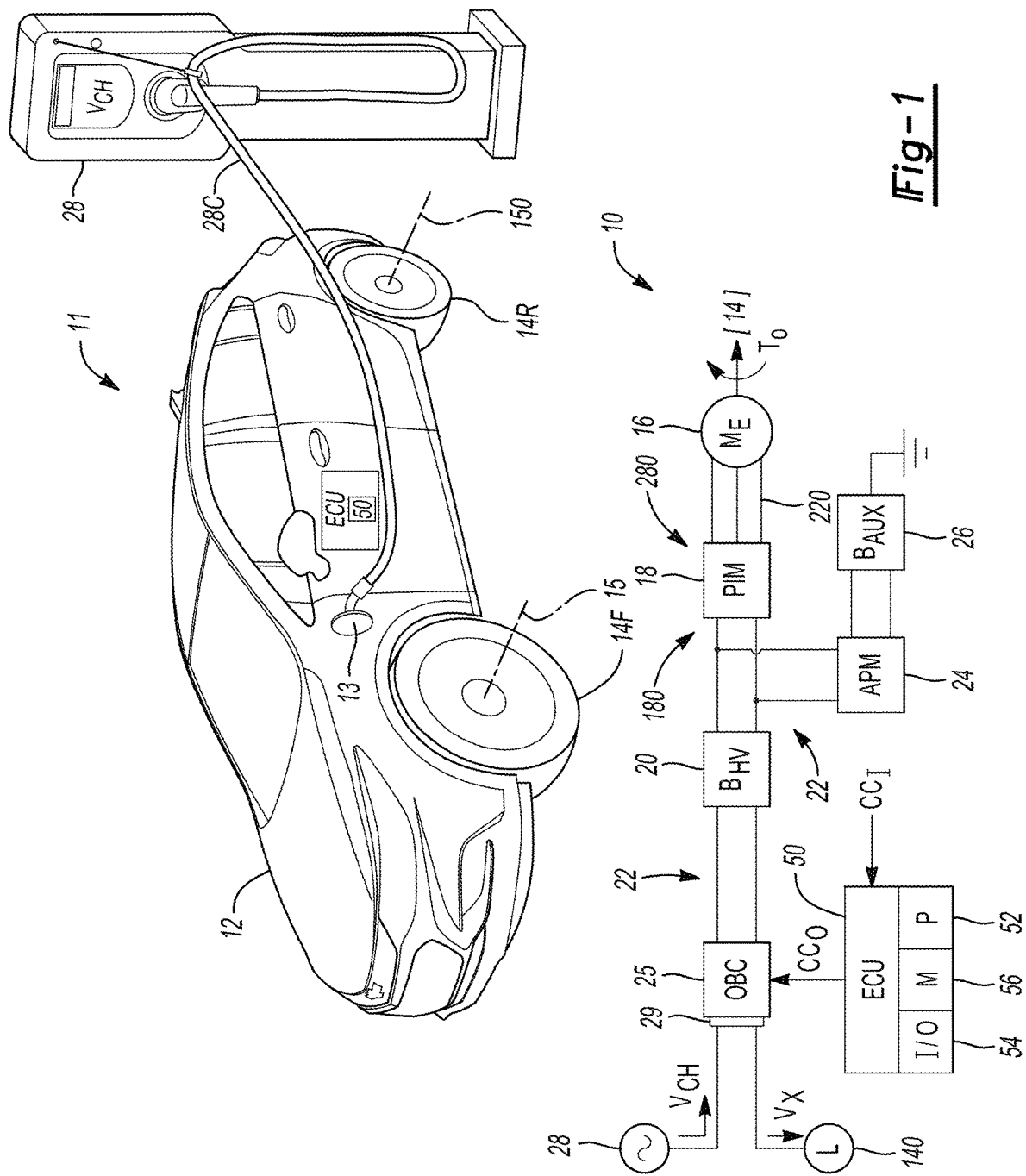
FIG. 1 is an exemplary electrified powertrain system equipped with a split-phase bidirectional on-board charger (OBC) configured as set forth herein.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 2:
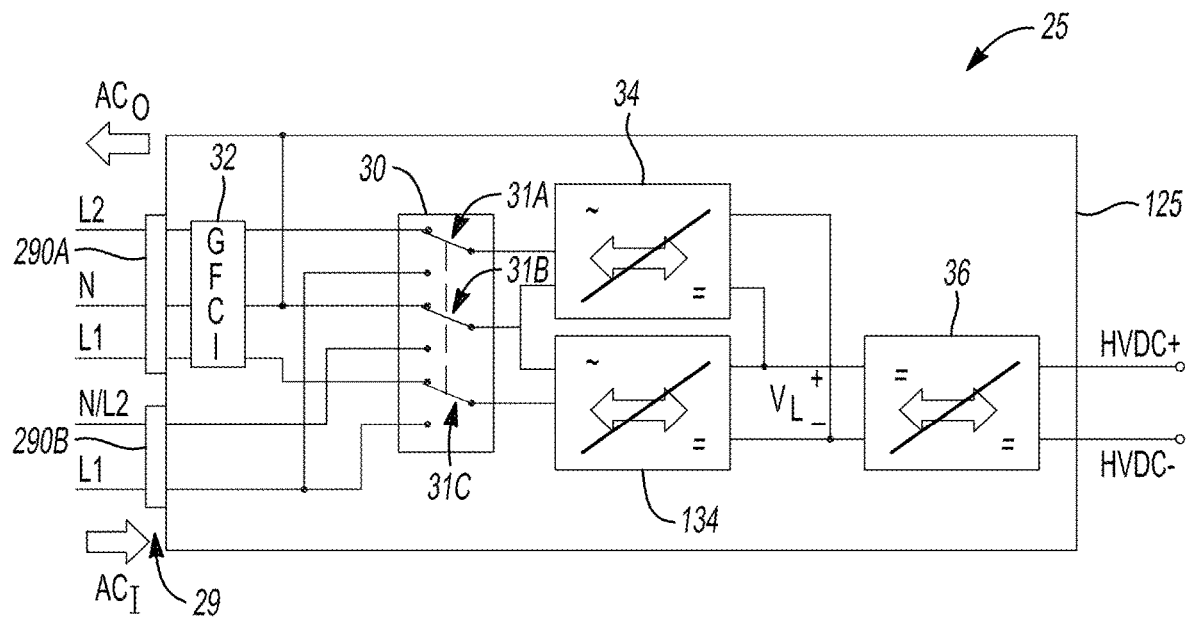
FIG. 2 is a representative hardware implementation of the OBC shown in FIG. 1.

Referring to the drawings, wherein like reference numbers refer to like features throughout the several views, FIG. 1 depicts an electrified powertrain system 10 having a split-phase bidirectional onboard charger (OBC) 25 constructed in accordance with the present disclosure. An exemplary embodiment of the OBC 25 is depicted in FIG. 2 and described in further detail below with reference to FIGS. 2 and 3. Use of the described OBC 25 allows for the selective delivery of a split-phase alternating current (AC) voltage output during vehicle-to-load (V2L) or vehicle-to-grid (V2G) operations—collectively referred to as vehicle-to-anything (V2X)—while at the same time retaining the capability of providing a single-phase AC voltage output. The solutions set forth herein are intended to provide such capabilities with a corresponding reduction in mass and required packaging space, thus facilitating integration with the electrified powertrain system 10 of FIG. 1, and with its particular host system.

With respect to such a host system, the electrified powertrain system 10 may be used as part of a motor vehicle 11 or another mobile system. As shown, the motor vehicle 11 exemplified in FIG. 1 (also see the motor vehicle 11A of FIG. 4) may be equipped as a battery electric vehicle, with the present teachings also being extendable to plug-in hybrid electric vehicles. Alternatively, the electrified powertrain system 10 may be used as part of another mobile system such as but not limited to a rail vehicle, aircraft, marine vessel, robot, farm equipment, etc. Likewise, the electrified powertrain system 10 may be stationary, such as in the case of a powerplant, hoist, drive belt, or conveyor system. Therefore, the electrified powertrain system 10 in the representative vehicular embodiment of FIGS. 1 and 4 is intended to be illustrative of the present teachings and not limiting thereof.

The motor vehicle 11 shown in FIG. 1 includes a vehicle body 12 and road wheels 14F and 14R, with "F" and "R" indicating the respective front and rear positions. The road wheels 14F and 14R rotate about respective axes 15 and 150, with the road wheels 14F, the road wheels 14R, or both being powered by output torque (arrow $T_O$) from a rotary electric machine ($M_E$) 16 of the electrified powertrain system 10 as indicated by arrow [14]. The road wheels 14F an 14R thus represent a mechanical load in this embodiment, with other possible mechanical loads being possible in different host systems. To that end, the electrified powertrain system 10 includes a power inverter module (PIM) 18 and a high-voltage battery pack ($B_{HV}$) 20, e.g., a multi-cell lithium-ion propulsion battery or a battery having another application-suitable chemistry, both of which are arranged on a high-voltage DC bus 22. As appreciated in the art, the PIM 18 includes a DC side 180 and an alternating current (AC) side 280, with the latter being connected to individual phase windings (not shown) of the rotary electric machine 16 when the rotary electric machine 16 is configured as a polyphase rotary electric machine in the form of a propulsion or traction motor as shown.

The battery pack 20 in turn is connected to the DC side 180 of the PIM 18 as shown, such that a battery voltage from the battery pack 20 is provided to the PIM 18 during propulsion modes of the motor vehicle 11. The PIM 18, or more precisely a set of semiconductor switches (not shown) residing therein, are controlled via pulse width modulation, pulse density modulation, or other suitable switching control techniques to invert a DC input voltage on the DC bus 22 into an AC output voltage suitable for energizing a high-voltage AC bus 220. High-speed switching of the resident semiconductor switches of the PIM 18 thus ultimately energizes the rotary electric machine 16 to thereby cause the rotary electric machine 16 to deliver the output torque (arrow $T_O$) as a motor drive torque to one or more of the road wheels 14F and/or 14R in the illustrated embodiment of FIG. 1, or to another coupled mechanical load in other implementations.

Electrical components of the electrified powertrain system 10 may also include an accessory power module (APM) 24 and an auxiliary battery ($B_{AUX}$) 26. The APM 24 is configured as a DC-DC converter that is connected to the DC bus 22, as appreciated in the art. In operation, the APM 24 is capable, via internal switching and voltage transformation, of reducing a voltage level on the DC bus 22 to a lower level suitable for charging the auxiliary battery 26 and/or supplying low-voltage power to one or more accessories (not shown) such as lights, displays, etc. Thus, "high-voltage" refers to voltage levels well in excess of typical 12-15 V low/auxiliary voltage levels, with 400 V or more being an exemplary high-voltage level in some embodiments of the battery pack 20.

The OBC 25 shown in FIG. 1 is selectively connectable to an offboard charging station 28 via input/output (I/O) coupling points 29 during a charging mode during which the battery pack 20 is recharged by an AC charging voltage ($V_{CH}$) from the offboard charging station 28.

The I/O coupling points 29 may include an output connector(s) 290A that is electrically connected to the switchgear block 30 and connectable to the external AC electrical load 140 during the discharging mode of the OBC 25. Additionally, the I/O outlets 29 may include an input connector(s) 290B electrically connected to the switchgear block 30 and connectable to a charging port 13. For instance, a charging cable 28C may be connected to the charging port 13 located on the vehicle body 12, e.g., via an SAE J1772 connection. The input connector 290B in such an embodiment is thus configured to receive AC power from a corresponding J1772 charging plug (not shown). The electrified powertrain system 10 may also be configured to selectively receive a DC charging voltage in one or more embodiments as appreciated in the art, in which case the OBC 25 would be selectively bypassed using circuitry (not shown) that is not otherwise germane to the present disclosure. For the purposes of the present disclosure, the OBC 25 operates in different modes: (1) a charging mode during which the OBC 25 receives the AC charging voltage ($V_{CH}$) from the offboard charging station 28 to recharge the battery pack 20, and (2) a discharging mode, represented by arrow V2X, during which the OBC 25 offloads power from the battery pack 20 to an external AC electrical load (L) 140. In this manner, the OBC 25 is bidirectional in its function and, as noted above, capable of providing a split-phase output and a single-phase output.

Still referring to FIG. 1, the electrified powertrain system 10 may also include an electronic control unit (ECU) 50. The ECU 50 is operable for regulating ongoing operation of the electrified powertrain system 10 via transmission of electronic control signals (arrow $CC_O$) to the OBC 25 and possibly other components or elements of the electrified powertrain system 10 as needed. The ECU 50 does so in response to electronic input signals (arrow $CC_I$). For the purposes of the present disclosure, the electronic input signals (arrow $CC_I$) may include communications and/or voltage signals from the offboard charging station 28 during the above-noted charging mode, requested offloading of power to the external AC electrical load 140 during V2X operations, etc. During the discharging mode, the electronic input signals (arrow $CC_I$) are indicative of the particular type of AC device or devices forming part of the external AC electrical load 140. Such input signals (arrow $CC_I$) may be actively communicated or passively detected in different embodiments, such that the ECU 50 is operable for determining a particular mode of operation. In response, the ECU 50 controls operation of the electrified powertrain system 10, in particular an internal state of the OBC 25 as set forth below with reference to FIG. 2.

To that end, the ECU 50 shown in FIG. 1 is equipped with one or more processors (P) 52, e.g., logic circuits, combinational logic circuit(s), Application Specific Integrated Circuit(s) (ASIC), electronic circuit(s), central processing unit(s), semiconductor IC devices, etc., as well as input/output (I/O) circuit(s) 54, appropriate signal conditioning and buffer circuitry, and other components such as a high-speed clock to provide the described functionality. The ECU 50 also includes an associated computer-readable storage medium, i.e., memory (M) 56 inclusive of read only, programmable read only, random access, a hard drive, etc., whether resident, remote or a combination of both. Control routines are executed by the processor 52 to monitor relevant inputs from sensing devices and other networked control modules (not shown), and to execute control and diagnostic routines to govern operation of the OBC 25 and possibly other components of the electrified powertrain system 10.

Referring to FIG. 2, the OBC 25 as contemplated herein includes the I/O coupling points 29 and a switchgear block 30 connected thereto. Additionally, the OBC 25 includes respective first and second DC-AC converters 34 and 134 as well as a DC-DC converter 36. The first DC-AC converter 34 and the second DC-AC converter 134 may each have a respective power capability that is about half of a power capability of the DC-DC converter 36 as described below. As part of the present approach, the DC-DC converter 36 operates in two different modes: (1) a voltage mode during which the OBC 25 ultimately provides the charging voltage to the DC bus 22, and (2) a current mode during which the OBC 25 provides an electrical current to the DC bus 22. The OBC 25 can provide a fixed voltage at its output during mode (1) during limited situations, such as when the battery pack 20 is not yet connected or the battery voltage needs to be tightly regulated at the end of a charge cycle. Achieving a DC link voltage ($V_L$) in a predetermined range is thus a prerequisite for operating the DC-DC converter 36, as appreciated in the art.

Presentation of the I/O coupling points 29 on an outer surface of a waterproof housing 125 allows the OBC 25 to be connected to external power for charging operations, and to the external AC electrical load 140 of FIG. 1 during V2X discharging operations. Although omitted from FIG. 2 for illustrative clarity and simplicity, those skilled in the art will appreciate that intervening electrical cables and other connection hardware would connect to the I/O coupling points 29 and extend to the charging port 13 of FIG. 1 for charging, and to a power outlet box 46 for V2X discharging, with the power outlet box 46 shown in FIG. 4 and described below. In this manner, the OBC 25 is bidirectional in terms of its power flow capability as indicated by respective output and input arrows $AC_O$ and $AC_I$.

A ground fault circuit interrupter (GFCI) 32 may be connected between the I/O coupling points 29 and the switchgear block 30 in some embodiments for further protection from ground faults during a V2X event. The switchgear block 30 as illustrated may include three switches 31A, 31B, and 31C. The first DC-AC converter 34 in this embodiment is connected to a first pair of the three switches, i.e., switches 31A and 31B, while the second DC-AC converter 134 is connected to a second pair of the three switches, i.e., switches 31B and 31C, such that the first DC-AC converter 34 and the second DC-AC converter 134 share one of the three switches 31A, 31B, and 31C in common, in this case the switch 31B. The three switches 31A, 31B, and 31C may be optionally embodied as mechanical relays or contactors, with solid-state switches being an alternative embodiment.

Electrical connections to the charging station 28 may be established via several voltage pins or terminals ("lines"), including voltage lines L1 and a tied neutral (N)/line L2 connection, as appreciated in the art. For instance, one may connect an SAE J1772 connector or another suitable connector type to the charging port 13 of FIG. 1 to feed the charging voltage $V_{CH}$ as AC power (arrow $AC_I$) into the OBC 25 during the charging mode. When discharging the battery pack 20 of FIG. 1 to the external AC electrical load 140 during V2X operations, additional outlets arranged at a convenient location aboard the motor vehicle 11 of FIG. 1 or the motor vehicle 11A of FIG. 4 may enable the external AC electrical load 140 to be connected to a suitable voltage level of the split-phase output.

The DC bus 22 for its part includes respective positive and negative voltage rails, i.e., HVDC+ and HVDC−. For illustrative clarity, the first and second DC-AC converters 34 and 134 are labeled with a double-headed arrow and corresponding AC and DC symbols, i.e., ~ and =, respectively, with the double-headed arrow indicating bidirectional powerflow. Similarly the DC-DC converter 36 is labeled with the bidirectional powerflow and corresponding DC symbol to indicate the DC conversion process.

With respect to the operation of the OBC 25, during the charging mode the first DC-AC converter 34 and the second DC-AC converter 134 are configured to output the DC link voltage ($V_L$) to the DC-DC converter 36. The DC-DC converter 36 in turn is configured to output a DC charging voltage to the DC bus 22 when the DC link voltage ($V_L$) reaches a predetermined value, e.g., a variable value based on the factors including the present state of charge of the battery pack 20. During the discharging mode, i.e., when powerflow is in the DC-to-AC direction, i.e., right-to-left as one view FIG. 2, the first DC-AC converter 34 and the second DC-AC converter 134 are configured to receive a DC discharging voltage or current from the DC-DC converter 36 and together selectively output a split-phase AC voltage to the switchgear block 30. Operation of the switches 31A, 31B, and 31C thereby provides power to the external AC electrical load 140 of FIG. 1.

Figure 3:
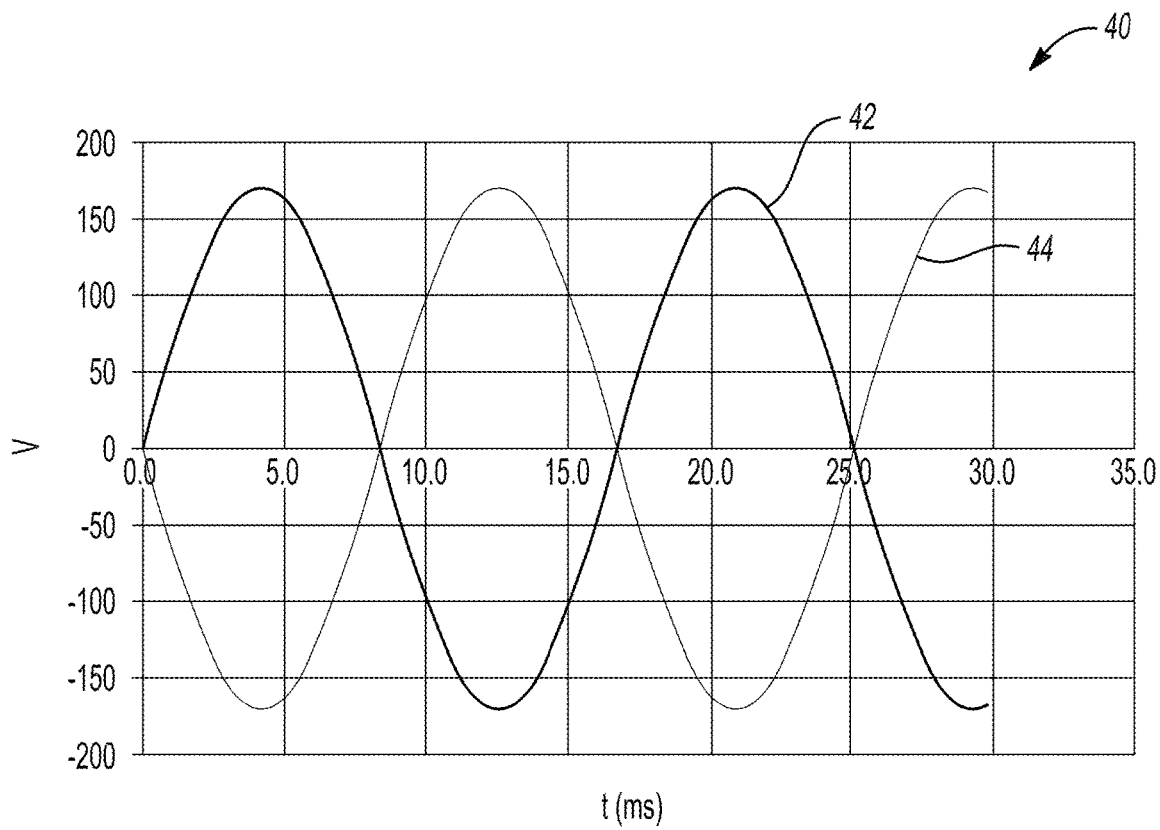
FIG. 3 is a corresponding representative split-phase output waveform of the OBC shown in FIG. 2.

Referring briefly to FIG. 3, a representative split-phase output waveform 40 is shown in which voltage waveforms 42 and 44 of an equal amplitude are 180° out-of-phase relative to one another. Root-mean-square (RMS) values of the illustrated voltage waveforms 42 and 44 with peaks of 170 V correspond to an RMS voltage of 120 $V_{RMS}$, i.e., $$\frac{170_{peak}}{\sqrt{2}} \cong 120 V_{RMS},$$

with such a value being representative and non-limiting. For simplicity, the RMS subscript is omitted below for 120 V and 240 V example voltages. In such an example, a user may connect a 120 V embodiment of the external AC electrical load 140 of FIG. 1 to an outlet presenting L1 (or L2) and N, thus providing a single-phase 120 V output to the external AC electrical load 140. Alternatively, a 240 V split-phase load could be connected to a plug presenting lines L1, L2, and N to provide 240 V (between L1 and L2) and 120 V (between L1 and N or L2 and N) power to the external AC electrical load 140.

Using an SAE J1772 charging plug as an example, such a plug ties together neutral (N) and voltage line L2, with this combination represented in FIG. 2 as N/L2. Along with voltage line L1, the SAE J1772 connection thus uses two wires for conducting powerflow during charging of the battery pack 20 via the offboard charging station 28 of FIG. 1. When discharging to the external split-phase AC electrical load 140, however, a third wire is needed, and thus requires the three-wire connector L1, L2, and N as shown in FIG. 2. The I/O coupling points 29 of FIG. 2 therefore allow for connection of lines L1, L2, N, and N/L2 as shown.

Referring to the motor vehicle 11A of FIG. 4, existing V2X operations using the OBC 25 are typically performed by plugging an accessory with an outlet or power strip into the charging port 13 of FIG. 1 to extract AC power from the vehicle. Detection of the power strip in such an implementation is a prerequisite for commencing V2X power offloading through the charging port 13. Supplying an AC voltage to terminals of the AC charging port 13 could pose a shock hazard if the terminals are accessible. The accessory effectively blocks the conductive pins or terminals of the charging port 13 from the touch hazard. When this accessory is plugged into the charging port 13, the vehicle is disabled from driving. In contrast, the present teachings may be implemented by connecting the power outlet box 46 to the motor vehicle 11A at a conveniently accessible location inside and/or outside of the motor vehicle 11A. Furthermore, the motor vehicle 110A can drive while power is supplied to the power outlet box 46.

For example, the power outlet box 46 could be secured within a forward and/or aft storage compartment 17 and/or 19, respectively, or within a passenger compartment of the motor vehicle 11A in different embodiments. When the motor vehicle 11A is configured as an electric pickup truck as shown, the forward storage compartment 17 may be used as a front trunk ("frunk") for transporting cargo, with the power outlet box 46 possibly mounted therewithin, perhaps flush with a wall to minimize protrusion into volume of the forward storage compartment 17. Similarly, the power outlet box 46 could be mounted within the aft storage compartment 19, in this example an open or enclosed truck bed, but possibly a trunk in other embodiments. Other possible locations could be used in other configurations of the motor vehicle 11A, or when the host system is an entirely different type of vehicle such as a boat, aircraft, train, etc., and therefore the representative locations of FIG. 4 are intended to be illustrative of just two possibilities.

In an exemplary implementation, the power outlet box 46 having power outlets 48A and 48B at respective first and second voltage levels V1 and V2 and corresponding receptacle configurations could be presented to a user as V2X power options when powering the external AC electrical load 140 shown in FIG. 1. Optionally, a user could depress a switch (not shown) located outside of the OBC 25 to selectively energize the power outlets 48A and 48B when desired. As an illustrative use example, an oven may have a nominal 240 V heating element, an auxiliary power board, and indicator lights, with the latter two features being powered by nominal 120 V power as appreciated in the art. Such an appliance could be connected to the OBC 25 of FIG. 1 by plugging into the aforementioned power outlet 48A and powered via the split-phase output described herein. Alternatively, one or more of the power outlets 48B could provide single phase power outlet from one of the DC-AC converters 34 or 134, e.g., when powering a radio or lights. The number and placement of the power outlets 48A and 48B could vary with the particular application.

Although the foregoing disclosure has been specified in terms of the representative electrified powertrain system 10 of FIG. 1 and the possible host systems of the motor vehicles 11 and 11A of FIGS. 1 and 4, respectively, those skilled in the art will appreciate that the described architecture lends itself to performance of a related method for controlling the split-phase bidirectional OBC 25 having the noted charging and discharging modes. Such a method may proceed as follows. During the charging mode, the method may include controlling, via the ECU 50 of FIG. 1, the first DC-AC converter and the second DC-AC converter to output the DC link voltage ($V_L$) to the DC-DC converter 36. The method may additionally include controlling the DC-DC converter 36 via the ECU 50 to output a DC charging voltage or current to the DC bus 22 when the DC link voltage ($V_L$) reaches a predetermined value. During the discharging mode, the method may include providing a DC discharging voltage or current from the DC-DC converter 36 to the first DC-AC converter 34 and the second DC-AC converter 134, as well as controlling the first and second DC-AC converters 34 and 134 via the ECU 50 to selectively output a split-phase AC voltage to a switchgear block 30 of FIG. 2, and to thereby power the external AC electrical load 140.

Such a method may include receiving AC power via the input connector 290B of the switchgear box 30 during the charging mode, with the input connector 290B having the aforementioned L1 voltage terminal and the combined L2/N voltage terminal. Also as described above, during the discharging mode the method may include selectively outputting a single-phase AC voltage via the switchgear block 30 to thereby power the external AC electrical load 140 with a single-phase AC waveform. In this manner, the split-phase bidirectional OBC 25 of FIG. 2 may be used to provide a wider range of power outputs, with a corresponding reduction in packaging size and mass. These and other attendant benefits will be appreciated by those skilled in the art in view of the forgoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A split-phase bidirectional on-board charger (OBC) for use with a direct current (DC) voltage bus, the OBC having a charging mode and a discharging mode, comprising:
   a switchgear block connectable to an offboard charging station during the charging mode, and to an external alternating current (AC) load during the discharging mode;
   a first direct current-to-alternating current (DC-AC) converter;
   a second DC-AC converter, wherein the first DC-AC converter and the second DC-AC converter are connected to the switchgear block; and
   a DC-DC converter connected to the first DC-AC converter, the second DC-AC converter, and the DC bus, wherein during the charging mode the first DC-AC converter and the second DC-AC converter are configured to output a DC link voltage to the DC-DC converter, and the DC-DC converter is configured to output a DC charging voltage or current to the DC bus when the DC link voltage reaches a predetermined value, and wherein during the discharging mode, the first DC-AC converter and the second DC-AC converter are configured to receive a DC discharging voltage or current from the DC-DC converter and together selectively output a split-phase AC voltage through the switchgear block to power the AC electrical load.

2. The OBC of claim 1, wherein the AC electrical load includes a single-phase AC device, and wherein the OBC is configured to output single-phase power via the first DC-AC converter or the second DC-AC converter to the single-phase AC device during the discharging mode.

3. The OBC of claim 1, wherein the switchgear block includes three switches, the first DC-AC converter is connected to a first pair of the three switches, and the second DC-AC converter is connected to a second pair of the three switches, such that the first DC-AC converter and the second DC-AC converter share one of the three switches in common.

4. The OBC of claim 3, wherein the three switches are mechanical relays or contactors.

5. The OBC of claim 3, further comprising an output connector that is electrically connected to the switchgear block and connectable to the external AC electrical load during the discharging mode of the OBC.

6. The OBC of claim 5, wherein the output connector includes a first voltage terminal, a second voltage terminal, and a neutral terminal, and wherein during the discharging mode:
the first pair of the three switches are respectively connected to the second voltage terminal and the neutral terminal; and
the second pair of the three switches are respectively connected to the neutral terminal and the first voltage terminal.

7. The OBC of claim 1, further comprising an input connector having an L1 voltage terminal and an L2/N voltage terminal.

8. The OBC of claim 7, wherein the input connector is configured to receive AC power from an SAE J1772 charging plug.

9. The OBC of claim 1, wherein the first DC-AC converter and the second DC-AC converter have a respective power capability that is about half of a power capability of the DC-DC converter.

10. An electrified powertrain system, comprising:
a direct current (DC) bus;
a power inverter having a DC side and an alternating current (AC) side;
a battery pack connected to the DC bus and to the DC side of the power inverter;
a polyphase rotary electric machine connected to the AC side of the power inverter and to a mechanical load; and
a split-phase bidirectional on-board charger (OBC) connected to the battery pack, and having a charging mode and a discharging mode, the OBC comprising:
a switchgear block connectable to an offboard charging station during the charging mode and to an external AC electrical load during the discharging mode;
a first DC-AC converter;
a second DC-AC converter, wherein the first DC-AC converter and the second DC-AC converter are connected to the switchgear block; and
a DC-DC converter connected to the first DC-AC converter, the second DC-AC converter, and the DC bus, wherein the first DC-AC converter and the second DC-AC converter have a respective power capability that is about half of a power capability of the DC-DC converter, and wherein:
during the charging mode the first DC-AC converter and the second DC-AC converter are configured to output a DC link voltage to the DC-DC converter, and the DC-DC converter is configured to output a DC charging voltage or current to the DC bus when the DC link voltage reaches a predetermined value; and
during the discharging mode the first DC-AC converter and the second DC-AC converter are configured to receive a DC discharging voltage or current from the DC-DC converter and together selectively output a split-phase AC voltage through the switchgear block to power the external AC electrical load.

11. The electrified powertrain system of claim 10, wherein the polyphase rotary electric machine includes an AC propulsion motor.

12. The electrified powertrain system of claim 11, wherein the electrified powertrain system is part of a motor vehicle, and wherein the mechanical load includes a set of road wheels connected to the AC propulsion motor.

13. The electrified powertrain system of claim 10, wherein the AC electrical load includes a single-phase AC device, and wherein the OBC is configured to output single-phase power to the single-phase AC device via the first DC-AC converter or the second DC-AC converter during the discharging mode.

14. The electrified powertrain system of claim 10, further comprising:
an output connector that is electrically connected to the switchgear block and connectable to the external AC electrical load during the discharging mode of the OBC.

15. The electrified powertrain system of claim 10, wherein the switchgear block includes three switches, the first DC-AC converter is connected to a first pair of the three switches, and the second DC-AC converter is connected to a second pair of the three switches, such that the first DC-AC converter and the second DC-AC converter share one of the three switches in common.

16. The electrified powertrain system of claim 15, wherein the output connector includes a first voltage terminal, a second voltage terminal, and a neutral terminal, and wherein during the discharging mode:
the first pair of the three switches are respectively connected to the second voltage terminal and the neutral terminal; and
the second pair of the three switches are respectively connected to the neutral terminal and the first voltage terminal.

17. The electrified powertrain system of claim 10, further comprising an input connector having an L1 voltage terminal and an L2/N voltage terminal, and wherein the input connector is configured to receive AC power from an SAE J1772 charging plug.

18. A method for controlling a split-phase bidirectional on-board charger (OBC) having a charging mode and a discharging mode, comprising:
during the charging mode:
controlling, via an electronic control unit (ECU), a first direct current-to-alternating current (DC-AC) converter and a second DC-AC converter on a DC bus to output a DC link voltage to a direct current-to-direct current (DC-DC) converter, wherein the first DC-AC converter is connected to a first pair of three switches of a switchgear block and the second DC-AC converter is connected to a second pair of the three switches of the switchgear block, such that the first DC-AC converter and the second DC-AC converter share one of the three switches in common; and
controlling the DC-DC converter via the ECU to output a DC charging voltage or current to the DC bus when the DC link voltage reaches a predetermined value; and
during the discharging mode:
providing a DC discharging voltage or current from the DC-DC converter to the first DC-AC converter and the second DC-AC converter; and
controlling the first DC-AC converter and the second DC-AC converter via the ECU to selectively output a split-phase AC voltage through a switchgear block to power an external AC electrical load.

19. The method of claim 18, further comprising receiving AC power via an input connector of the switchgear block during the charging mode, the input connector having an L1 voltage terminal and an L2/N voltage terminal.

20. The method of claim 18, further comprising:
during the discharging mode, commanding the first DC-AC converter or the second DC-AC converter to selectively output a single-phase AC voltage to the switchgear block to thereby power the external AC electrical load.

* * * * *